United States Patent [19]
Yoshida et al.

[11] Patent Number: 5,224,195
[45] Date of Patent: Jun. 29, 1993

[54] LIGHT WAVELENGTH CONVERTER FOR A WAVELENGTH OF LASER BEAMS INTO A SHORT WAVELENGTH

[75] Inventors: Toshihiko Yoshida; Masanori Watanabe; Osamu Yamamoto, all of Nara, Japan

[73] Assignee: Sharp Kabushiki Kaisha, Osaka, Japan

[21] Appl. No.: 723,500

[22] Filed: Jun. 28, 1991

[30] Foreign Application Priority Data

Jun. 28, 1990 [JP] Japan .................. 2-172285

[51] Int. Cl.⁵ .................. G02B 6/36; G02B 6/00
[52] U.S. Cl. .................. 385/122; 385/129; 385/130; 359/326
[58] Field of Search ............. 385/122, 129, 130–132; 359/326–332

[56] References Cited

U.S. PATENT DOCUMENTS

| | | | |
|---|---|---|---|
| 3,822,927 | 7/1974 | Zernike | 385/122 |
| 4,583,817 | 4/1986 | Papuchon | 385/122 X |
| 4,820,011 | 4/1989 | Umegaki et al. | 385/122 X |
| 4,830,447 | 5/1989 | Kamiyama et al. | 385/129 X |
| 4,838,638 | 6/1989 | Kamiyama et al. | 385/122 |
| 4,893,888 | 1/1990 | Okazaki et al. | 385/130 X |
| 4,973,117 | 11/1990 | Yamada | 385/122 X |
| 5,007,694 | 4/1991 | Yamamoto et al. | 385/122 X |
| 5,046,802 | 9/1991 | Yamamoto et al. | 359/328 |
| 5,109,462 | 4/1992 | Watanabe et al. | 359/328 |

FOREIGN PATENT DOCUMENTS 0310435 4/1989 European Pat. Off. .
63-269132 11/1988 Japan .

OTHER PUBLICATIONS

Patent Abstracts of Japan, vol. 13, No. 87, (P-835) (Feb. 28, 1989).
Patent Abstracts of Japan, vol. 14, No. 59, (P-1000) (Feb. 2, 1990).

*Primary Examiner*—Akm E. Ullah
*Attorney, Agent, or Firm*—Morrison & Foerster

[57] ABSTRACT

A light wavelength converter which includes a laser beam source for radiating fundamental waves, a first optical waveguide formed on a substrate so as to convert the fundamental waves into harmonics which are radiated through the substrate, a grating coupler provided on the substrate so as to receive the harmonics propagated through the substrate, and a second optical waveguide formed on the substrate, the second optical guide being connected to the grating coupler so as to radiate the harmonics outside.

1 Claim, 4 Drawing Sheets

LIGHT WAVELENGTH CONVERTER FOR A WAVELENGTH OF LASER BEAMS INTO A SHORT WAVELENGTH

BACKGROUND OF THE INVENTION

1. Field of the Invention:

The present invention relates to a light wavelength converter used for information processors, such as an optical memory disc system or a laser beam printer, and optical measuring instruments, where it is required to convert a wavelength of laser beams into a short wavelength.

2. Description of the Prior Art:

An information processor, such as an optical memory disc system or a laser beam printer, and an optical measuring instrument use laser beams emitted from a semiconductor laser device excellent in focusability and directivity. In general, a laser beam emitted from a semiconductor laser device is a near infrared beam having an oscillation wavelength of 780 nm or 830 nm.

In recent years, in order to increase the amount of information to be processed in the information processors, or to enhance the measuring accuracy in the optical measuring instruments, short wavelength laser beams are required. In the information processor, the laser beams emitted from the semiconductor laser device are condensed at a predetermined place so as to write the information or images. The wavelength of the laser beams is normally proportional to the diameter of the focusing spot, which means that the shorter the wavelength of a laser beam is, the smaller the diameter of the focusing spot becomes. The smaller the diameter of the focusing spot is, the greater amount of information in terms of the recording density is written into the optical memory disc.

In the laser beam printer, the size of images to be printed can be reduced by reducing the wavelength of the laser beam, which means that the recording density and resolution are enhanced. Moreover, if green and blue laser beams are easily obtained, a high speed and high resolution color printer can be achieved by combining a commonly used red laser beam. In optical measuring instruments, the measuring precision is enhanced by shortening the wavelength of the laser beam.

Recently, it is known that a semiconductor laser device using III-V compound semiconductor materials emits laser beams having oscillation wavelengths in the 600 nm level (for example, 680 nm), but so long as group III-V compound semiconductor materials are used, it is difficult to obtain laser beams having much shorter wavelengths. Therefore, efforts are made to develop semiconductor laser devices using ZnSe, ZnS and other group II-VI compound semiconductor materials, but at present even p-n junctions have not yet been realized. As is evident from this fact, no semiconductor laser devices capable of oscillating shortwave green and blue laser beams are available because of the unavailability of suitable materials. As a substitute, a large-scaled laser device such as an argon ion laser device and other gas lasers are used to obtain green, blue and other shortwave laser beams.

In order to solve this problem, methods for obtaining green and blue shortwave laser beams have been proposed without using large-scale gas lasers but with the wavelength of laser beams oscillated by solid-state lasers and semiconductor laser devices. One of the methods is a sum frequency generation; that is, a plurality of optical frequencies are mixed to change the wavelengths of a laser beam. A present typical example is the generation of second harmonics or third harmonics where two or three waves having the same frequency are mixed. Currently, by the second harmonic generating method, green laser beams with a wavelength of 0.53 μm are generated using a YAG (yttrium aluminum garnet) laser with a wavelength of 1.06 μm. Blue laser beams with a wavelength of 0.415-0.42 μm are also generated by using semiconductor laser beams with a wavelength of 0.83-0.84 μm.

An example of the generation of second harmonics using semiconductor laser beams with a wavelength of 0.84 μm is reported in "Oyo Buturi" (meaning Applied Physics) (vol. 56, No. 12, pages 1637-1641 (1987)). According to this literature, an optical waveguide is formed on a $LiNbO_3$ substrate by a proton-exchange method so as to generate second harmonics with an optical output of 0.4 mW at a conversion efficiency of 1% by using semiconductor laser beams having a wavelength of 0.84 μm and an optical output of 40 mW. When the semiconductor laser beams are introduced into the optical waveguide, which is 2.0 μm wide and 0.4 μm deep, second harmonics are emanated into the substrate at an incline of approximately 16.2° thereto. At this point, the second harmonics and the fundamental waves are automatically phase-matched, thereby providing no restriction on the angle between the beam and the crystal and the temperature of the crystal. However, the output light has no axially symmetrical cross-section but has a crescent-shaped cross-section. Therefore it is impossible to focus the light up to the limit of diffraction, thereby making it impossible to make use of the light.

A light wavelength converter which has solved the above-mentioned problem is described in "Resumes of the Autumn Applied Physics Academic Meeting" of 1989, at page 921. This converter is provided with a glass tube in which a crystallized non-linear material is packed so as to generate second harmonics by axially symmetrical Cerenkov radiation. This second harmonics are focused up to the limit of diffraction by the use of an axial lens. This converter has a disadvantage in that it involves a troublesome packing of non-linear material in a narrow tube, which restricts the type of the material to organic substance. In addition, since the tube has a diameter of a few microns, it is difficult to produce tubes having exactly same diameters. The crystal axis becomes fixed by the relationship between the tube and the non-linear material. This prevents the full utilization of non-linear nature of the material. It is easy to obtain organic non-linear material having a large non-linear optical constant but normally it is difficult to control the crystal axis. From a practical point of view, the known light wavelength converter has a problem.

SUMMARY OF THE INVENTION

The light wavelength converter of this invention, which overcomes the above-discussed and numerous other disadvantages and deficiencies of the prior art, comprises a laser beam source for radiating fundamental waves, a first optical waveguide formed on a substrate so as to convert the fundamental waves into harmonics during transmission and radiation through the substrate, a grating coupler provided on the substrate so as to receive the harmonics propagated through the substrate, and a second optical waveguide formed on the substrate, the second optical guide being connected to the grating coupler so as to radiate the harmonics outside.

In a preferred embodiment, the substrate is made of non-linear material.

In a preferred embodiment, the grating coupler is formed on the top surface of the substrate so as to receive the harmonics reflecting from the bottom surface thereof, and wherein the second waveguide is formed on the top surface of the substrate in such a manner as to be aligned with an extension of the first waveguide.

In a preferred embodiment, the fundamental waves are directly introduced into the first waveguide.

In a preferred embodiment, the first waveguide includes a grating coupler receiving the fundamental waves.

Alternatively, the light wavelength converter comprising a laser beam source for radiating fundamental waves, a loop-shaped wavelength converting waveguide formed on the top surface of a substrate, a first optical waveguide formed on the same top surface of the substrate so as to guide fundamental waves into the loop-shaped wavelength converting waveguide, the fundamental waves being converted into harmonics and radiated through the substrate, a grating coupler provided on the substrate so as to receive the harmonics propagated through the substrate, and a second optical waveguide formed on the substrate, the second optical guide being connected to the grating coupler so as to radiate the harmonics outside therethrough.

In a preferred embodiment, the wavelength converting waveguide and the first waveguide have portions in parallel with each other, and the mutually parallel portions constitute a directional grating coupler.

In a preferred embodiment, the wavelength converting waveguide has a thicker portion than the first and second waveguides, the thicker portion constituting a second harmonics generator which radiates second harmonics.

In a preferred embodiment, the grating coupler and the second waveguide are formed on the top surface of the substrate, and wherein the light coupler receives the second harmonics radiated from the second harmonics generator and reflecting from the bottom surface of the substrate.

In a preferred embodiment, a pair of electrodes are additionally disposed with the loop-shaped wavelength converting waveguide interposed therebetween so as to control the resonant condition of the fundamental waves.

In a preferred embodiment, an optical detector is additionally provided on the substrate, the optical detector detecting the second harmonics radiated by the second harmonics generator, and controlling the pair of electrodes.

Thus, the invention described herein makes possible the objective of providing a wavelength converter capable of constantly radiating light which is excellent in focusability.

BRIEF DESCRIPTION OF THE DRAWINGS

This invention may be better understood and its numerous advantages will become apparent to those skilled in the art by reference to the accompanying drawings as follows:

FIG. 1 (b) is a front view showing the light wavelength converter shown in FIG. 1 (a);

FIG. 4 (b) is a front view showing the light wavelength converter shown in FIG. 4 (a);

DESCRIPTION OF THE PREFERRED EMBODIMENTS

Example 1

Figure 1A:
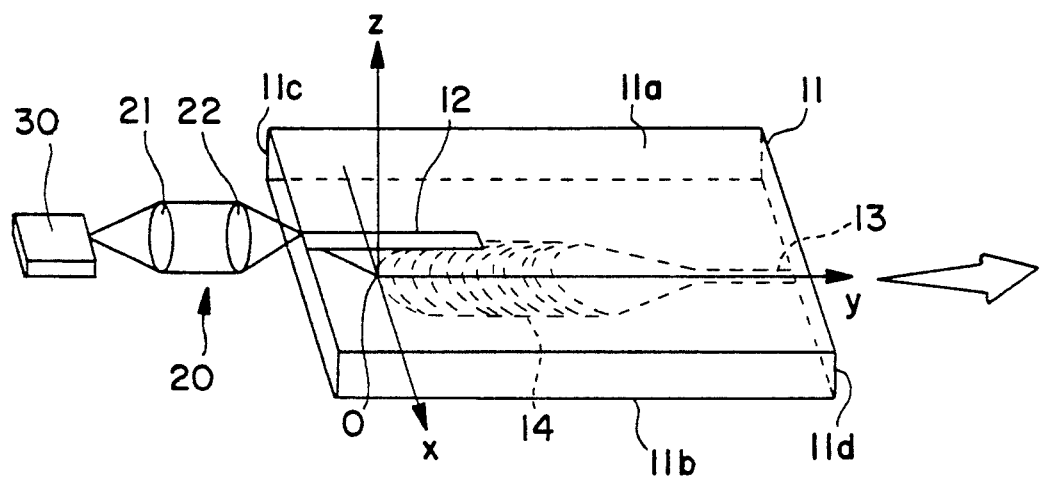
FIG. 1 (a) is a perspective view showing a first example of a light wavelength converter according to the present invention.
Figure 1B:
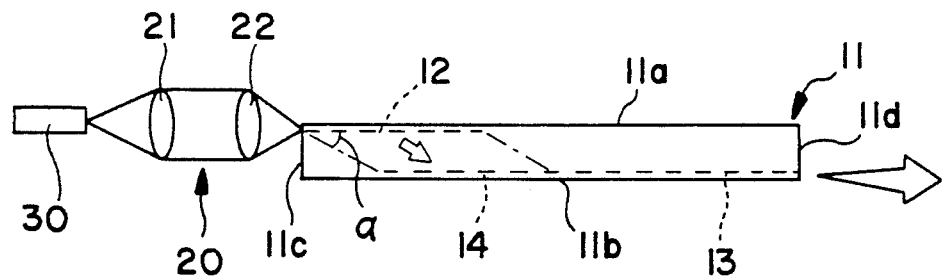

Referring to FIGS. 1 (a) and 1 (b), a light wavelength converter of this invention comprises a rectangular-shaped crystalline substrate 11 having a non-linear optical effect, an input optical waveguide 12 formed on a top surface 11a of the substrate 11. The input waveguide 12 extends from a side face 11c of the substrate 11 up to a central portion thereof. The location of the input waveguide 12 is restricted to one side of the substrate 11. In this specification, the "top" and "bottom" are relative terms; they can be replaced by "first" and "second" or any other convenient references.

An optical system 20 including a pair of condenser lenses 21 and 22 are located in opposition to the side face 11c of the substrate 11 so as to allow a light from a semiconductor laser source 30 to pass through. The light oscillated from the laser source 30 passes through the optical system 20 whereby is focused on the end face of the input waveguide 12 that is located on the side face 11c, and from there the light is introduced into the input waveguide 12.

The condenser lens 22 toward the substrate 11 has a sufficiently large numerical aperture (NA); in the illustrated embodiment, the condenser lens 22 has a numerical aperture of 0.6. An additional waveguide is provided. This is an output waveguide or linear optical waveguide 13 which extends from a side face 11d of the substrate 11 up to a central portion thereof. The side faces 11c and 11d of the substrate 11 are opposite to each other.

The output waveguide 13 is provided on a bottom surface 11b of the substrate 11; that is, on the opposite side to the input waveguide 12. The output waveguides 13 on the bottom surface of the substrate 11 is provided on and along the extension of the input waveguide 12 on the opposite surface thereof.

The reference numeral 14 denotes a diffraction grating coupler provided in the central portion of the bottom surface 11b of the substrate 11, continuous to the output waveguide 13. The output waveguide 13 becomes narrow and the width of the grating coupler 14 becomes equal thereto. The coupler 14 becomes wider as it is away from the output waveguide 13. From the central portion up to the input waveguide 12 the width becomes widest where a predetermined grating pattern is formed.

The semiconductor laser source 30 oscillates a laser beam having a wavelength of 830 nm as fundamental waves, and the laser beam passes through the optical system 20 whereby it is introduced into the input waveguide 12. The fundamental waves introduced in the input waveguide 12 is converted into second harmonics having a wavelength of 415 nm within the input waveguide 12. The resulting second harmonics is radiated at an angle of α, commonly called Cerenkov radiation, so as to become phase-matched with the fundamental waves.

The second harmonics radiated into the substrate 11 are introduced into the grating coupler 14, which has a sufficient width to receive all the Cerenkov radiation, and the second harmonics received in the grating coupler 14 are converted into a single mode during transmission through the grating coupler.

The output waveguide 13 is thinner than the input waveguide 12 so that the second harmonic passing therethrough maintains a single mode. Accordingly, the second harmonics are focused up to the diffraction limit, and caused to pass through the output waveguide 13. Then they are output from the side face 11d of the substrate 11.

The substrate 11 is made of $LiNbO_3$ having a relatively larger non-linear optical constant. The input waveguide 12 is made by a proton-exchange method. One example of the process is as follows:

A crystalline substrate 11 of rectangular shape is made of Z-cut $LiNbO_3$, and a molybdenum (Mo) or other metal thin film for masking is deposited on the Z-cut $LiNbO_3$ crystalline substrate 11 by an electron beam depositing method. The deposited thin film is subjected to photolithographic patterning by the use of photoresist on the top surface 11a of the substrate 11. The Mo metal thin film is etched under the photoresist mask pattern. In this way the input waveguide 12 is formed. The same process is applied to the bottom surface of the substrate 11 so as to form an output waveguide 13 at a predetermined position; more specifically, a mask pattern is formed for the output waveguide 13 after the position is aligned with the input waveguide 12. A Mo film is used as a mask for a proton-exchange method. In this way the output waveguide 13 is formed. The waveguides 12 and 13 are further processed as follows:

The substrate 11 having the waveguides 12 and 13 was immersed in a proton-exchange solution at 200° C. until they are 0.3 μm deep. After the output waveguide 13 was covered, the proton-exchange method was again continued until the input waveguide 12 became to a desired depth, and its end faces of the substrate 11 was subjected to optical grinding.

Referring to FIGS. 1 (a) and 1 (b), a process of forming a specific grating pattern of the grating coupler 14 will be described:

The point where the second harmonics subjected to Cerenkov radiation at a radiation angle α are introduced into the grating coupler 14 is determined as the origin 0 (zero). The direction in which the output waveguide 13 is extended is y, the direction perpendicular to the axis y on the bottom surface of the substrate 11 is x, and the direction perpendicular to both axes y and x is z. The thickness of the substrate 11 is d. The effective refractive index of the input waveguide 12 is N, the effective refractive index of the output waveguide 13 is n, the focus point at which the second harmonics are focused within the grating coupler 14 is F, the distance between the origin 0 and the point F is f, and the wavelength of the second harmonics is λ. The following equation is obtained:

$$n\{y \cos\alpha + (\sqrt{x^2 + d^2} - d)\sin\alpha\} + N\sqrt{x^2 + (y-f)^2} = m\lambda + N \cdot f.$$

where m is a number indicating one of the curves constituting the grating coupler; that is, the pattern of the grating coupler is represented by the group of the curves represented by the equation with different integers in m while other parameters remain the same.

Figure 2:
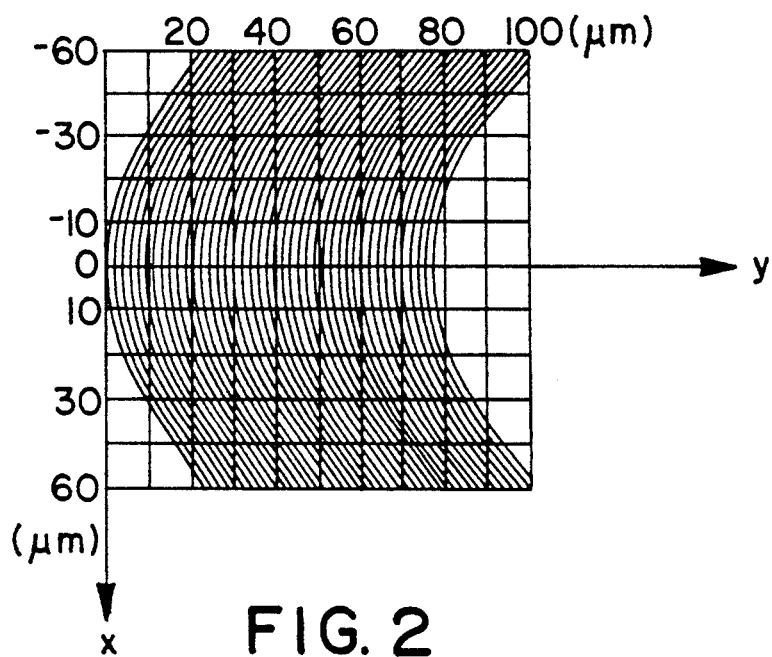
FIG. 2 is a graph showing an example of a grating pattern.
Figure 3A:
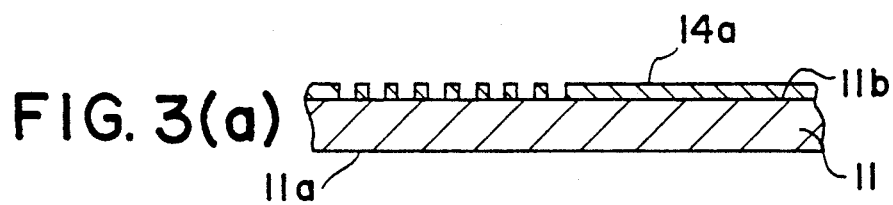
FIGS. 3 (a) to 3 (c) are cross-sectional views showing the process of manufacturing a grating coupler, particularly showing a substrate.
Figure 3B:
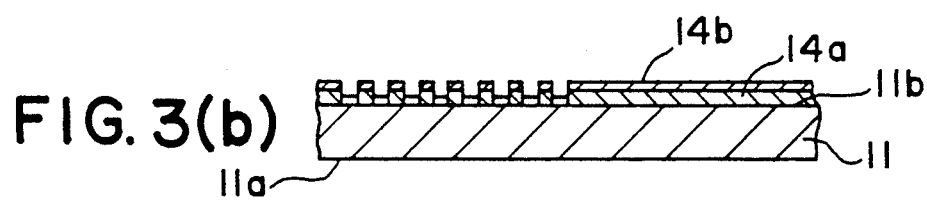
Figure 3C:
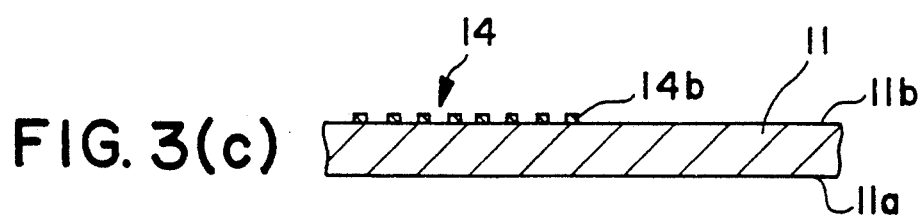

FIG. 2 illustrates the pattern shown by this equation. This pattern is fabricated by the known manner as follows:

As shown in FIG. 3 (a), a photoresist pattern 14a is formed by photolithography in correspondence to the output waveguide 13 (in FIGS. 3 (a) to 3 (c) the substrate 11 is upside down as compared with that shown in FIG. 1). Then a transmissive material such as $TiO_2$ and ITO is deposited by electron beam deposition or sputtering (FIG. 3 (b)). Finally, a usual lift-off process is applied (FIG. 3 (c)). The grating has a rectangular cross-section but can be triangular or a saw-tooth shape or any other optional shape.

Example 2

Figure 4A:
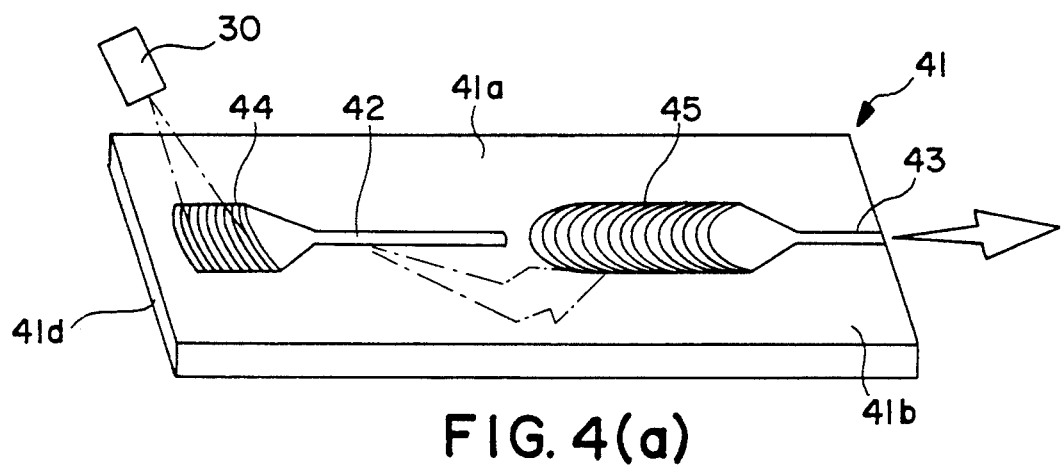
FIG. 4 (a) is a perspective view showing a modified light wavelength converter according to the present invention.
Figure 4B:
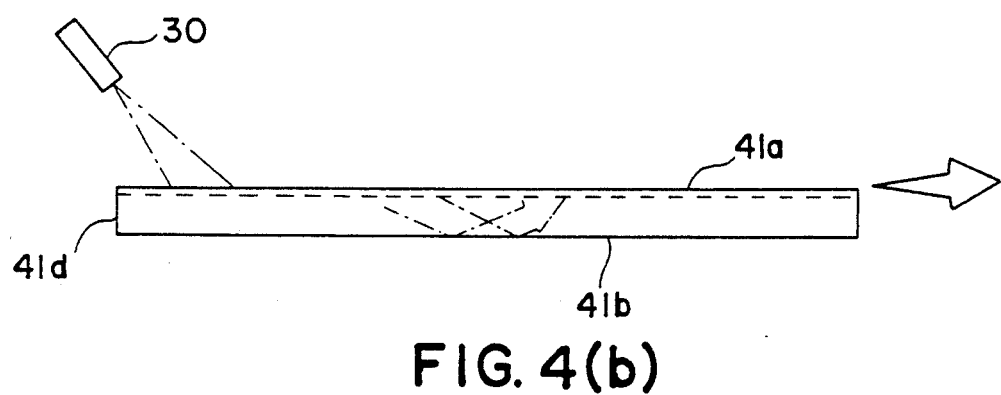

Referring to FIGS. 4 (a) to 4 (b), a modified version of the wavelength converter will be described:

A substrate 41 is prepared, and a linear-shaped wavelength converting waveguide (hereinafter referred to as waveguide) 42 having a depth of 0.4 μm is formed on the top surface 41a of the substrate 41. This waveguide 42 has one end located adjacent to the central portion of the substrate 41, and the other end connected to a grating coupler 44 provided in a side face of the substrate 41. The grating coupler 44 is irradiated with a laser beam oscillated from a semiconductor laser source 30. The laser beam is introduced into the waveguide 42 through the grating coupler 44.

A linear-shaped output waveguide 43 is provided in the opposite side face of the substrate 41. The output waveguide 43 is 0.3 μm deep, having one end connected to a grating coupler 45 located adjacent to the central portion of the top surface of the substrate 41, and the other end connected to a side face of the substrate 41.

The fundamental waves introduced in the input waveguide 42 are converted into second harmonics during transmission through the input waveguide 42, and the second harmonics are Cerenkov radiated into the substrate 41. The second harmonics introduced in the substrate 41 are reflected on a bottom surface 41b of the substrate 41, and introduced into the output waveguide 43. The second harmonics are output from the side face 41d of the substrate 41.

This embodiment can be fabricated in the aforementioned manner but since the input and output waveguides 42 and 43 are formed on the top surface 41a, a photoresist pattern can be formed by a single photolithography. The input and output waveguides 42 and 43 are subjected to proton-exchange until it becomes 0.3 μm deep, and then a Mo layer is deposited on the output waveguide 43. The input waveguide 42 is again subjected to proton-exchange until it becomes 0.4 μm deep.

Example 3

Figure 5:
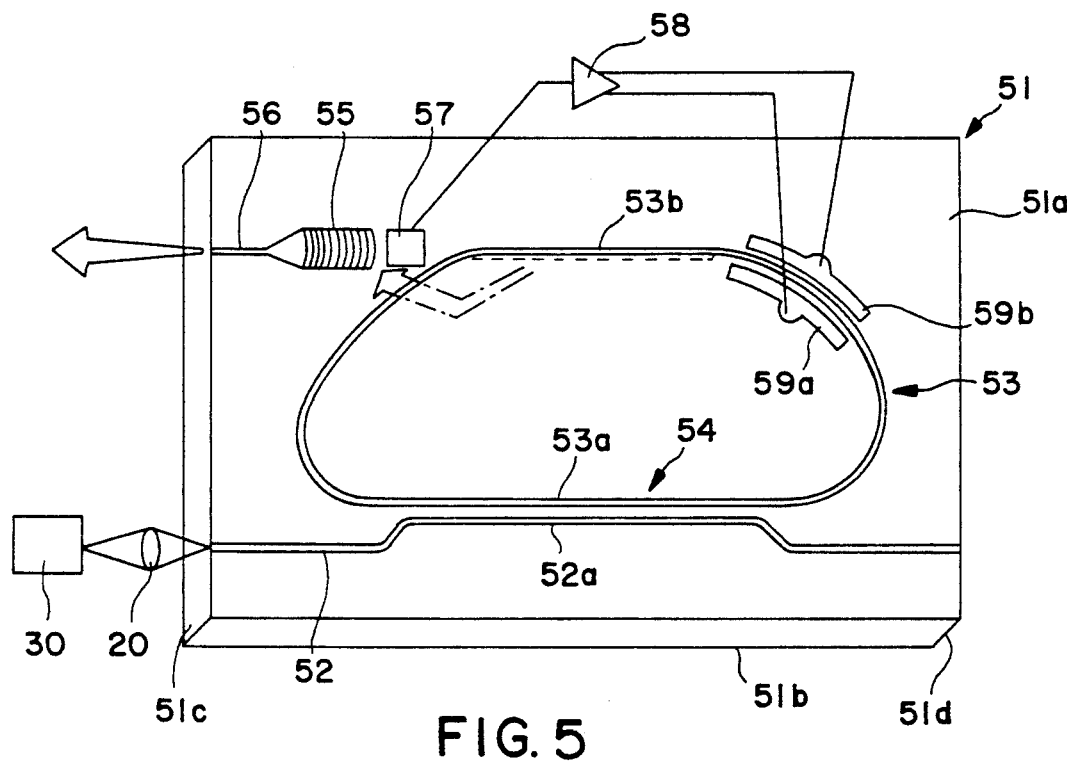
FIG. 5 is a perspective view showing another modified version of the light wavelength converter.
Figure 6:
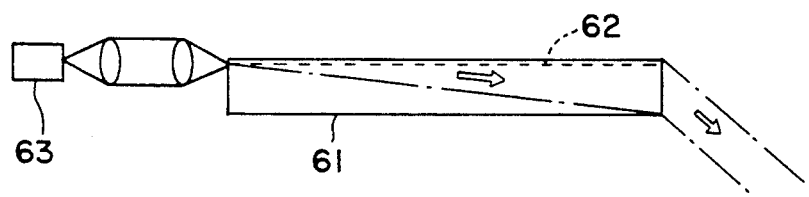
FIG. 6 is a schematic view showing the structure of a known light wavelength converter.

Referring to FIG. 5, another modified version of the wavelength converter will be described:

A substrate 51 is prepared, and a linear-shaped input waveguide 52 is formed on the top surface 51a of the substrate 51. This input waveguide 52 extends from one end face 51c to the other end 51d of the substrate 51, and has a linear central portion 52a. A loop-shaped wavelength converting waveguide 53 (hereinafter called "loop-shaped waveguide") is formed on the top surface 51a of the substrate 51. This loop-shaped waveguide 53 has a linear portion 53a parallel with the linear central portion 52a of the input waveguide 52. The linear portions 52a and 53a constitute a directional coupler 54.

The semiconductor laser source 30 is provided in opposition to one end face 51c of the substrate 51 with an optical system 20 interposed therebetween. The laser beam oscillated from the source 30 is introduced into the input waveguide 52, and the fundamental waves are introduced into the output waveguide 53 by the directional coupler 54. In this way the laser beam is transmitted through the loop-shaped waveguide 53.

The loop-shaped waveguide 53 has a second harmonics radiating section 53b at other side opposite to the linear portion 53a, which constitutes the directional coupler 54. This second harmonics radiating section 53b is thicker than other parts of the loop-shaped waveguide 53. Second harmonics are Cerenkov radiated into the substrate 51 from the second harmonics radiating section 53b. The second harmonics introduced into the substrate 51 is reflected on the bottom surface 51b of the substrate 51.

A grating coupler 55 is formed on the top surface 51a of the substrate 51 so as to enable the second harmonics reflected on the bottom surface 51b to be incident thereto. An output waveguide 56 is formed on the top surface 51a of the substrate 51. This output waveguide 56 is connected to the grating coupler 55, and connected to other end face 51c of the substrate 51. The second harmonics introduced into the coupler 55 are introduced into the output waveguide 56, and output from the end face 51c of the substrate 51 after being transmitted throughout the output waveguide 56.

Part of the second harmonics which are radiated from the radiating section 53b and reflected on the bottom surface 51b is introduced into an optical detector 57 whose output is given to an amplifier 58. The output of the amplifier 58 is given to a pair of electrodes 59a and 59b designed to control the fundamental waves in transmission throughout the second harmonics radiating section 53b. The amplifier 58 controls voltage applied to the electrodes 59a and 59b so that a maximum output of the second harmonics may be obtained which is detected by the optical detector 57. When a predetermined potential is reached between the electrodes 59a and 59b, the refractive index of the portion of the loop-shaped waveguide 53 between the electrodes 59a and 59b is changed under the photoelectric effect, thereby resulting in a prolonged optical length. Thus, the length of the loop-shaped waveguide 53 is controlled.

In the illustrated embodiments the substrate is made of $LiNbo_3$ but any other material such as $LiTaO_3$, KTP, BBO, KTA or $KNbO_3$ if it is suitable for making waveguides and produces non-linear optical effects.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A light wavelength converter comprising a laser beam source for radiating fundamental waves, a first optical waveguide formed on a substrate so as to convert the fundamental waves into harmonics during transmission through the substrate, said fundamental waves being focused on one side of the substrate to be introduced into the optical waveguide, a second optical waveguide formed separately from the optical waveguide on the substrate so as to radiate the harmonics radiated into the substrate to the outside form the other side of the substrate, and a grating coupler provided on the substrate so as to allow the harmonics radiated into the substrate to propagate through the second waveguide, wherein the pattern of the grating coupler is represented by the group of the curves when m are different integers as follows:

$$n\{y * \cos \alpha + (\sqrt{x^2 + d^2} - d) * \sin \alpha\} + \sqrt{Nx^2 + (y - f)^2} = m\lambda + Nf$$

where a point in the grating coupler is determined as the origin 0, the direction in which the second optical waveguide is extended is the axis y, the direction perpendicular to the axis y on the surface on which the grating coupler of the optical waveguide is formed is the axis x, the direction perpendicular to both axes y and x is the axis z, the radiation angle at which the harmonics is radiated from the first optical waveguide is a, the distance between the origin and the focus point at which the harmonics are focused within the grating coupler is f, the thickness of the substrate is d, the effective index of the first optical waveguide is N, the effective refractive index of the second optical waveguide is n, and the wavelength of the harmonics is λ.

* * * * *